(12) United States Patent　　(10) Patent No.: US 8,718,666 B1
Singh et al.　　(45) Date of Patent: May 6, 2014

(54) CONTROLLING RESOURCE UTILIZATION

(75) Inventors: Jasinder Pal Singh, Olathe, KS (US); Sachin R. Vargantwar, Overland Park, KS (US); Maulik K. Shah, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 191 days.

(21) Appl. No.: 13/355,771

(22) Filed: Jan. 23, 2012

(51) Int. Cl.
*H04M 3/00* (2006.01)
*H04W 72/00* (2009.01)
*H04B 7/00* (2006.01)

(52) U.S. Cl.
USPC .............. 455/452.2; 455/418; 455/452.1; 455/522

(58) Field of Classification Search
CPC ..... H04W 23/02; H04W 24/00; H04W 24/04; H04W 72/121; H04W 14/04; H04W 14/10; H04W 52/24; H04W 52/26; H04W 52/38; H04W 1/72
USPC ........ 455/447–454, 464, 63.3, 509, 418–419, 455/552, 550.1
See application file for complete search history.

(56) References Cited

U.S. PATENT DOCUMENTS

| | | | | |
|---|---|---|---|---|
| 6,134,443 A | * | 10/2000 | Spann et al. | 455/450 |
| 6,950,399 B1 | * | 9/2005 | Bushmitch et al. | 370/236 |
| 7,197,315 B1 | * | 3/2007 | Stephens et al. | 455/450 |
| 7,573,847 B2 | * | 8/2009 | Rogers et al. | 370/329 |
| 7,974,238 B2 | * | 7/2011 | Blythe et al. | 370/329 |
| 8,073,458 B2 | * | 12/2011 | Chang | 455/453 |
| 8,213,361 B1 | * | 7/2012 | Sarkar et al. | 370/328 |
| 8,320,385 B1 | * | 11/2012 | Bali et al. | 370/395.4 |
| 8,422,440 B2 | * | 4/2013 | Hayashi et al. | 370/329 |
| 8,452,287 B2 | * | 5/2013 | Hamada | 455/436 |
| 2012/0014332 A1 | * | 1/2012 | Smith et al. | 370/329 |

* cited by examiner

*Primary Examiner* — Meless Zewdu (57) ABSTRACT

The invention is directed to methods and systems for controlling resource utilization. In particular, resources in a wireless telecommunications network may be monitored and controlled to eliminate unnecessary resource usage. Channels on the network, and the users thereof, may be monitored to identify under-utilized channels based on predetermined thresholds. If an under-utilized channel is identified, users may be immediately or subsequently transferred to another channel on the network and resources to the under-utilized channel may be eliminated. The channels may be dynamically monitored such that any changes in usage are addressed and users may be transferred multiple times to conserve resources.

10 Claims, 5 Drawing Sheets

CONTROLLING RESOURCE UTILIZATION

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, controlling resource utilization. In embodiments, resources for wireless telecommunications systems are monitored and controlled to eliminate waste and unnecessary usage. Resources may be power amplifiers, channel cards, and the like. Broadly speaking, resources may be anything required in order to utilize a channel of a wireless telecommunications network. In specific embodiments, a number of users on a plurality of channels may be identified and, based on the number of users on each channel, resources may be eliminated from the channel associated with a lowest number of users. This resource elimination to under-utilized channels may increase resource conservation and eliminate unnecessary use of resources.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BTS Base Transceiver Station
GPRS General Packet Radio Service
GSM Global System for Mobile communications (Groupe Spécial Mobile)
HA Home Agent
HTTP Hypertext Transfer Protocol
IP Internet Protocol
IPv4 Internet Protocol Version Four
IPv6 Internet Protocol Version Six
NFC Near-Field Communication
PDA Personal Data Assistant
PDSN Packet Data Serving Node
PPP Point-to-Point Protocol
RNC Radio Network Controller Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward controlling resource utilization. Specifically, embodiments of the present invention are directed toward controlling resource utilization in a wireless telecommunications network. A number of users on a plurality of channels on the network may be identified. Several predetermined criteria may be used to identify under-utilized channels such as a number of users, peak times, non-peak times, a number of accesses of the network from a channel, and the like. Based on the predetermined criteria, resources may be eliminated from under-utilized channels. This resource elimination to under-utilized channels may increase resource conservation and eliminate unnecessary use of resources.

In a first aspect, computer-readable media having computer-executable instructions embodied thereon that, when executed, enable a computing device to perform a method for controlling resource utilization. A quantity of channels utilized is identified. A channel may be a frequency within a network and is utilized when it is receiving one or more resources to facilitate one or more telecommunications actions. A quantity of users associated with each channel of the quantity of channels is identified and, based on the quantity of users, an under-utilized channel that is associated with a smallest quantity of users is identified. The smallest quantity of users is transferred from the under-utilized channel to at least one other channel of the quantity of channels. One or more resources being delivered to the under-utilized channel is eliminated.

In a second aspect, computer-readable media having computer-executable instructions embodied thereon that, when executed, enable a computing device to perform a method for controlling resource utilization. A first channel within a network that is associated with existing traffic under a predetermined threshold is identified. New traffic is eliminated from accessing the first channel and activity of the existing traffic associated with the first channel is monitored. It is identified when activity of the existing traffic has stopped and the existing traffic is transferred from the first channel to one or more other channels.

In a third aspect, computer-readable media having computer-executable instructions embodied thereon that, when executed, enable a computing device to perform a method for controlling resource utilization. A first set of channels of a network that is utilized is identified along with a first set of users associated with each channel of the first set of channels. Based on the first set of users associated with each channel of the first set of channels, an under-utilized channel that is associated with a smallest quantity of users is identified. The smallest quantity of users is transferred from the under-utilized channel to a second channel of the first set of channels. One or more resources being delivered to the under-utilized channel is eliminated. After a predetermined period of time, a quantity of users associated with each channel of the first set of channels is updated and, based on the update, the one or more resources are re-provided to the under-utilized channel. A second set of users is then directed to the under-utilized channel.

Figure 1:
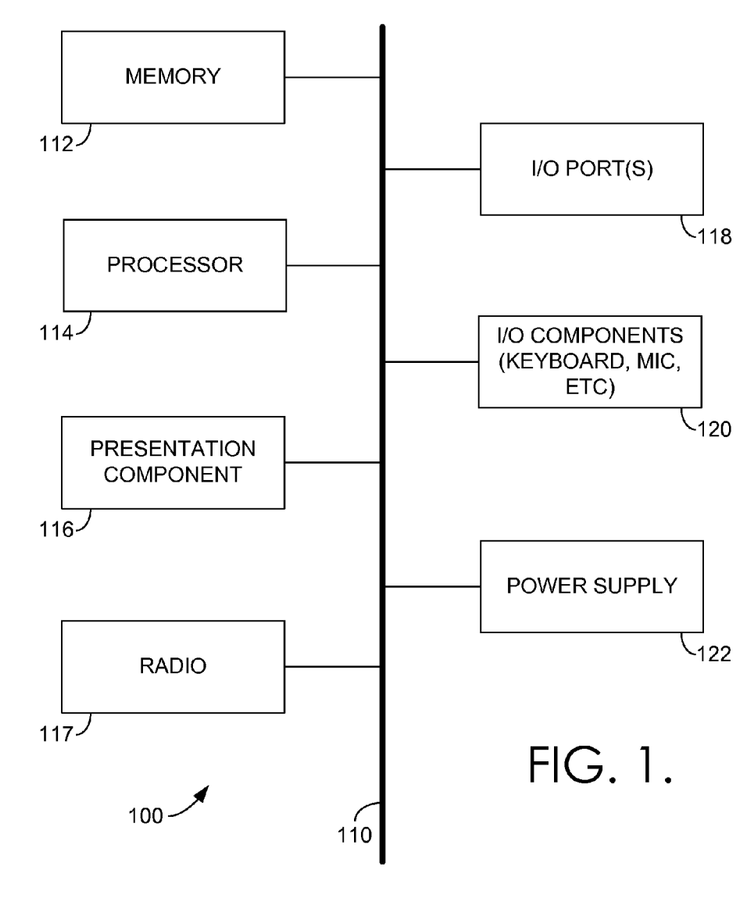
FIG. 1 depicts a block diagram of a mobile device in accordance with an embodiment of the present invention.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as Wimax® technology and also Long Term Evolution (LTE)). In some embodiments, radio 117 might also facilitate other types of wireless communications including Wi-Fi®, Bluetooth® communications, GIS communications, and other near-field communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
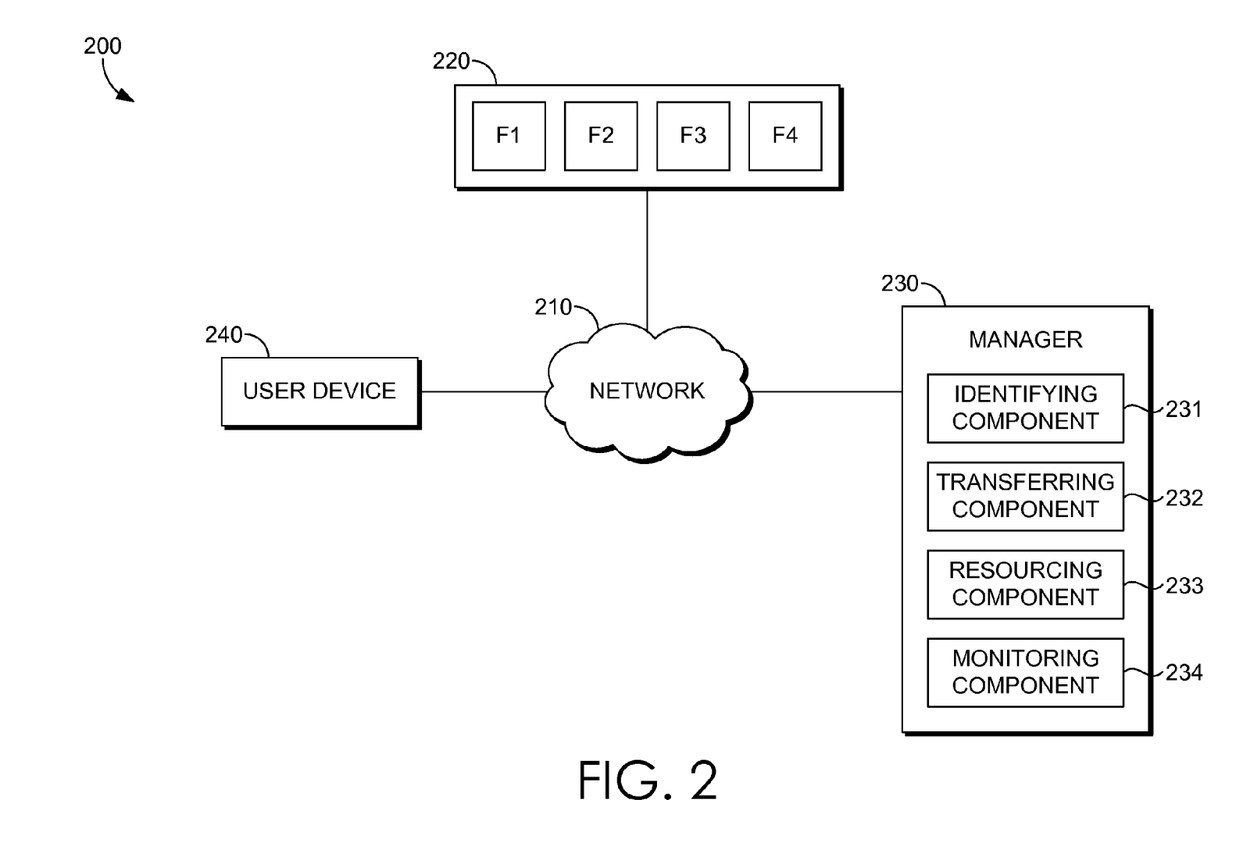
FIG. 2 depicts a system diagram of an exemplary system for carrying out embodiments of the present invention.

FIG. 2 depicts a block diagram of an exemplary system suitable for controlling resource utilization and is referenced generally by the numeral 200. It will be understood that the exemplary system 200 shown in FIG. 2 is merely an example of one suitable computing system environment for use with embodiments of the present invention. Neither should the exemplary system 200 be interpreted as having any dependency or requirement related to any single module/component or combination of modules/components illustrated therein. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The exemplary system 200 includes a network 210, one or more channels 220, a manager 230, and a user device 240. As mentioned, other components not shown here may also be used to carry out aspects of the present invention. Further, several components shown in FIG. 2 may be combined into a single component although shown separately in FIG. 2. The components illustrated in FIG. 2 may communicate with one another by way of network 210. Network 210 may include, without limitation, one or more LANs and/or wide area networks WANs. Such networking environments are commonplace in offices, enterprise-wide computer networks, intranets, and the Internet. Accordingly, network 210 is not further described herein.

As mentioned, some components are not depicted in FIG. 2 so as to not obscure aspects of the various embodiments of the present invention. For instance, network 210 may include various components that are not shown. One of these components may be a network-access gateway (not shown) that helps facilitate communication between user device 240 and other networks (not shown) as well as the Internet (not shown).

Channels 220 may be referred to as frequencies within a network. One of ordinary skill in the art will recognize the use of common terms such as frequencies or channels to describe features of a network. In order to be utilized, or operable, channels 220 may receive one or more resources to fuel their operability. For instance, the one or more resources may include power amplifiers, channel cards, and the like. As used herein, resources may generally be described as anything needed to make a channel operable.

Channels 220 illustrate four specific channels labeled as F1, F2, F3, and F4. Terms may be used interchangeably throughout such that F1, F2, F3, and F4 may be commonly referred to as frequencies (e.g., frequency 1, frequency 2, frequency 3, and frequency 4) rather than channels. Each frequency may be associated with one or more users, or user devices. A frequency is associated with one or more users, or user devices, when a user or user device is utilizing the frequency to access a network, such as network 210. For example, a user device may be a mobile phone that is associated with frequency 2 in order to access a wireless telecommunications network to, for example, send messages, make phone calls, and the like.

Typically, a wireless telecommunications provider is allocated a specific amount of channels (e.g., F1-F500) such that the provider is only able to utilize the channels to which it is associated. With an increase in the number of users of wireless telecommunications technology, the demand for frequencies has increased. However, it is not necessary that every frequency assigned to a provider is operating all the time.

In the context of FIG. 2, assume that F1, F2, F3, and F4 have been allocated to the same wireless telecommunications provider. The provider may use F1, F2, F3, and F4 to accommodate the number of users of the network. The provider may identify predefined thresholds to assess the utilization of the channels. For instance, exemplary thresholds may include, but are not limited to, a number of users associated with a specific channel, a number of calls per user associated with a specific channel, a number of attempts from a specific channel to access the network, peak times, non-peak times, and the like. The predefined thresholds may be referred to as low-loading conditions. Low-loading conditions, as used herein, refer generally to one or more criteria assessing utilization, or usage, of a channel.

In order to manage the utilization of the channels, manager 230 includes various components to assist in monitoring the channels. The manager 230 includes an identifying component 231, a transferring component 232, a resourcing component 234, and a monitoring component 234. Each component of manager 230 may assist in managing utilization of channels. Manager 230 may be implemented as a stand-alone component or, alternatively, may be integrated into one or more components of system 200.

Identifying component 231 may be configured to identify one or more predefined thresholds. As explained above, the one or more predefined thresholds may include, but is not limited to, a number of users associated with a specific channel, a number of calls per user associated with a specific channel, a number of attempts from a specific channel to access the network, peak times, non-peak times, and the like. The predefined thresholds may be customized for a particular organization's needs.

Identifying component 231 may identify the criteria associated with one or more predefined thresholds and determine whether the one or more predefined thresholds is met. For instance, a predefined threshold may be that a channel have X number of calls generated in a particular time period. If, during the time period, the channel has less than X number of calls, it may be identified as an under-utilized channel, meaning that it does not satisfy the predefined threshold to continue operating. Another channel may have more than X number of calls for the time period and, thus, may be identified as satisfying the predefined threshold.

Identifying component 231 may be further configured to identify additional factors. For example, identifying component 231 may identify a number of channels used on the network. Additionally, identifying component 231 may identify a rise is a signal level. For example, a Reverse Noise Rise (RNR) may be identified. A Reverse Noise Rise, as used herein, refers generally to an indication of signals received in a geographical area. The RNR is an indication of a number of users on a network. It is not an actual number, but it is a very good indicator. Both the number of channels used on the network and the RNR may be utilized to identify under-utilized channels. In alternative embodiments, it is possible to use only the RNR or only the number of channels used on the network, rather than the combination of the two.

An additional factor to identify by identifying component 231 may be peak times and non-peak times. Peak times, as used herein, refer generally to specific times of day that include more noise on a channel than other times of day. Non-peak times, as used herein, refer generally to specific times of day that includes less noise on a channel than other times of day. For instance, the hours of 2 a.m. to 5 a.m. may include less noise than, for example, 4 p.m. to 8 p.m. One or more channels that are identified to be in non-peak times (e.g., non-peak channels) may be identified as under-utilized. Non-peak times are an opportunity to eliminate some channels that are not necessary due to the reduced noise that should be accommodated by the channels.

Once an under-utilized channel is identified based on, for example, the above-described predefined thresholds, transferring component 232 may be activated to begin transferring one or more users associated with the under-utilized channel to another channel on the network. For instance, assume that channel F4 of one or more channels 220 is identified as under-utilized. Transferring component 232 may be activated such that any users associated with F4 are transferred from the F4 channel to any other channel on the network (e.g., F1, F2, or F3).

In embodiments, users are transferred from under-utilized channels while they are active on the network. For example, a user may be accessing data from the data while it is being transferred to another channel. In additional embodiments, system 200 may wait until a user goes idle before transferring that user to another channel. System 200 may further wait until a user leaves a channel rather than transferring the user at all. Regardless of whether users are transferred while active or idle, system 200 may block new users from accessing the under-utilized channel such that the under-utilized channel may be relieved from all users.

Transferring component 232 may transfer users while they are active in, for example, a code-division multiple access (CDMA) environment. Transferring component 232 may wait for a user to become idle or leave the under-utilized channel in, for example, a long term evolution (LTE) environment. Additional environments such as Global System for Mobile Communications (GSM).

Transferring component 232 may transfer users from an under-utilized channel to any other channel on the network. A network provider may set specific rules for which channels transferring component 232 may transfer users to from under-utilized channels. For example, the network provider may desire to load lead carriers first (e.g., F1) rather than subsequent carriers (e.g., F2 and F3). Alternatively, the network provider may desire to load up a channel that is associated with a highest number of users first until it reaches capacity.

Once transferring component 232 has transferred each user associated with the under-utilized channel to another channel on the network, resourcing component 233 may eliminate all resources being communicated to the under-utilized channel. Resourcing component 233 could, alternatively, only eliminate those resources that are required to operate the under-utilized channel that are, thus, the most taxing resources. For instance, resourcing component 233 may eliminate power to the under-utilized channel. By eliminating resources to the under-utilized channel, it is not running when it is not necessary and, thus, resources are conserved as they are not needlessly expended.

Monitoring component 234 is configured to continuously monitor channels on a network. By continuously monitoring the channels, and usage thereof, monitoring component 234 provides updated information to system 200 (e.g., manager 230) in order to modify available channels. For instance, if a previously-identified under-utilized channel that has lost access to one or more resources is identified as necessary due to over-loading of other channels on the network, the under-utilized channel may have resources restored and one or more users associated with it in order to alleviate the load to other channels. Alternatively, if a channel is identified as under-utilized that was not previously identified as under-utilized, monitoring component 234 may let manager 230 know of the development and transferring component 232 and resourcing component 233 may work together to transfer users and eliminate resources to the newly-identified under-utilized channel.

Figure 3:
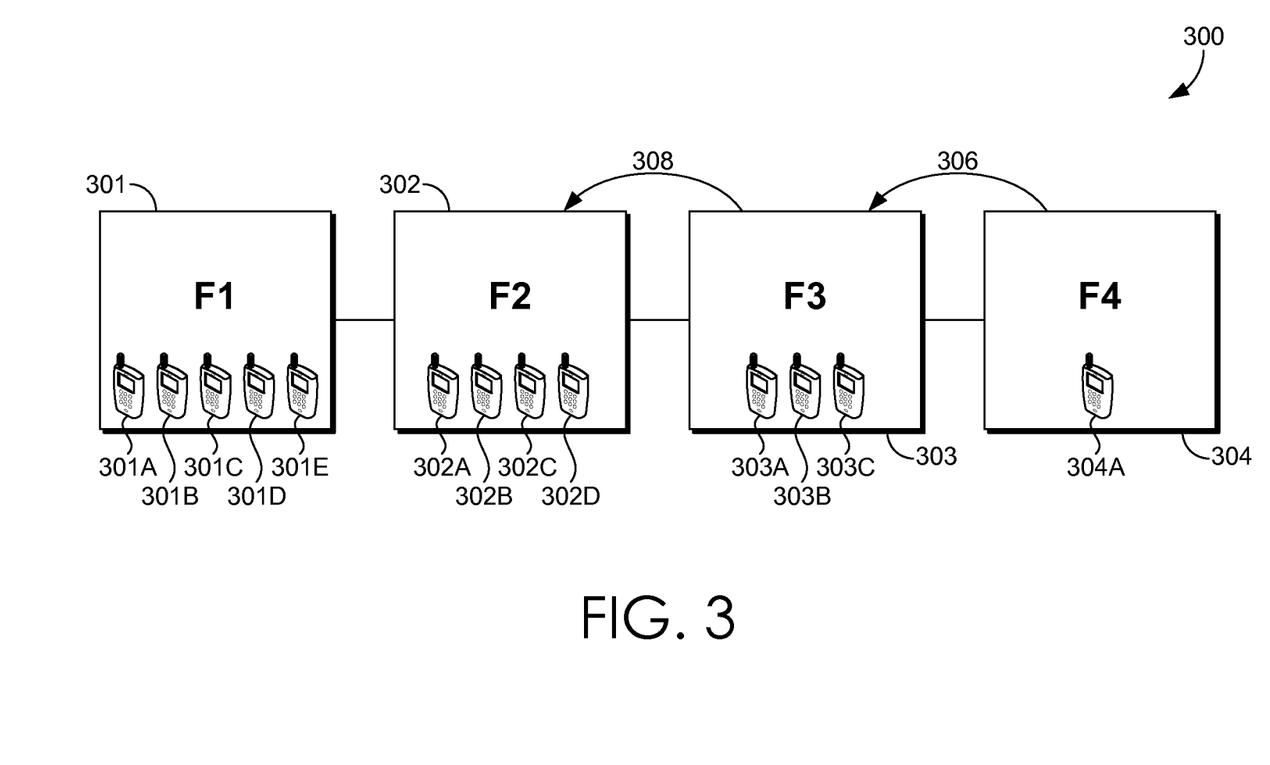
FIG. 3 depicts a diagram of an exemplary system for carrying out embodiments of the present invention.

Turning now to FIG. 3, an exemplary system 300 is illustrated. System 300 includes F1 channel 301, F2 channel 302, F3 channel 303, and F4 channel 304. Each of channels F1, F2, F3, and F4 are channels on a network. Additionally, each of channels F1, F2, F3, and F4 are associated with one or more users, or user devices. F1 channel 301, for instance is associated with user devices 301A, 301B, 301C, 301D, and 301E. F2 channel 302 is associated with user devices 302A, 302B, 302C, and 302D. F3 channel 303 is associated with user devices 303A, 303B, and 303C while F4 channel 304 is associated with user device 304A.

An identifying component, such as identifying component 231 of FIG. 2, may identify criteria designated by a network provider. Such criteria may include a number of users associated with each channel, peak times, and the like. Assume in this example that the desired criteria is a number of users associated with each channel. An identifying component may identify, in the present example, that F4 channel 304 is associated with the smallest number of users as it is only associated with one user. Upon detecting that the number of users associated with F4 channel 304 is below a predetermined threshold, user device 304A may under a transfer 306 to, for example, F3 channel 303. Once that happens, F4 channel 304 may lose access to the one or more resources that are powering F4 channel 304. For instance, power may be eliminated from F4 channel 304.

Continuing with the above example, it may be determined that even after transfer 306 of user device 304A to F3 channel 303 that F3 channel 303 is also under a predetermined threshold of users. If that is the case, each user device associated with F3 channel 303 may undergo a transfer 308 to, for example, one of F1 channel 301, F2 channel 302, or a combination thereof. In embodiments, both F4 channel 304 and F3 channel 303 may be identified at the same time as meeting criteria for removal of one or more resources rather than separately identifying the under-utilization.

Figure 4:
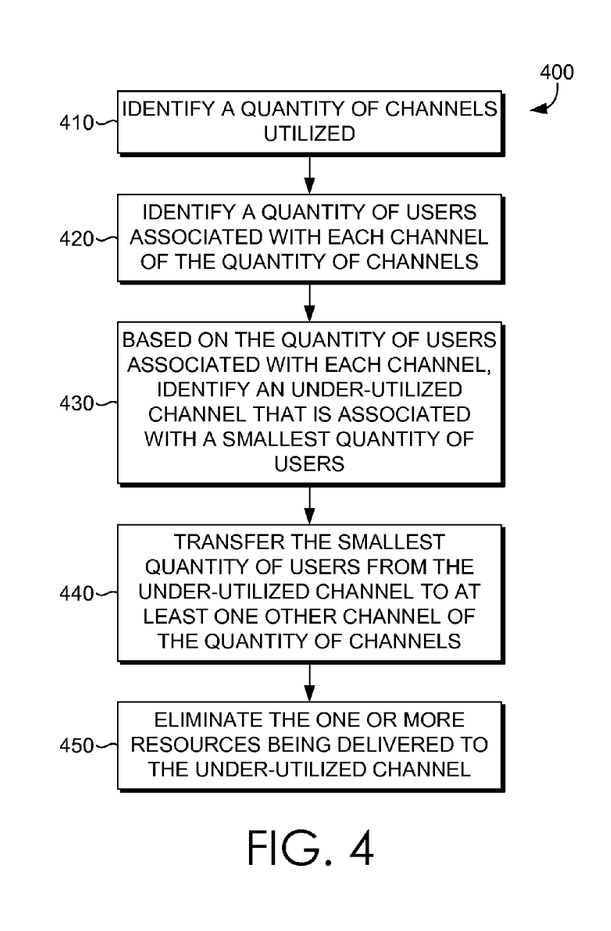
FIG. 4 depicts an illustrative flow diagram that depicts a method for controlling resource utilization, in accordance with an embodiment of the present invention.

Turning now to FIG. 4, referenced generally by the numeral 400, a flow diagram is depicted showing a method of controlling resource utilization. Initially, at step 410, a quantity of channels utilized is identified. A channel is utilized when it is receiving one or more resources to facilitate one or more telecommunications actions. At step 420, a quantity of users associated with each channel of the quantity of channels is identified. At step 430, an under-utilized channel that is associated with a smallest quantity of users is identified. At step 440, the smallest quantity of users is transferred from the under-utilized channel to at least one other channel of the quantity of channels. At step 450, the one or more resources being delivered to the under-utilized channel is eliminated.

Figure 5:
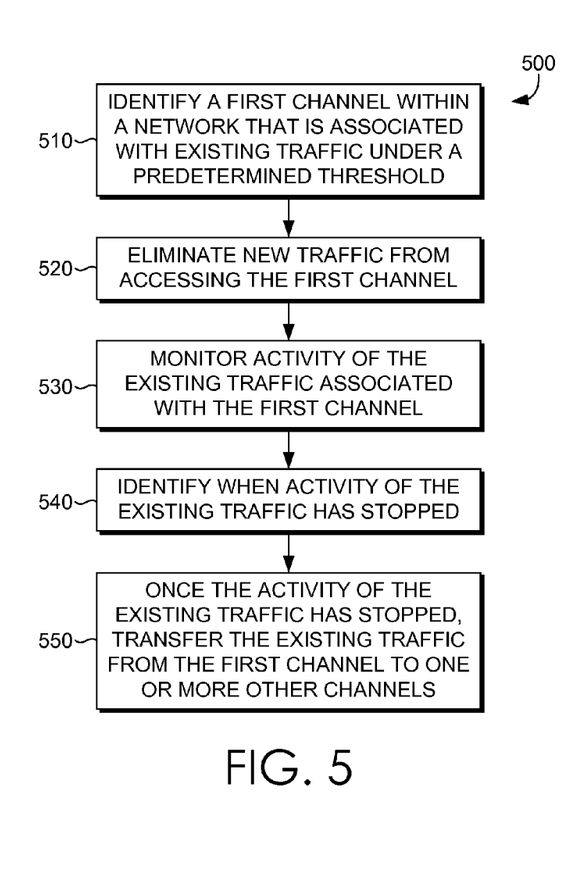
FIG. 5 depicts an illustrative flow diagram that depicts a method for controlling resource utilization, in accordance with an embodiment of the present invention.

Turning now to FIG. 5, referenced generally by the numeral 500, a flow diagram is depicted showing a method of controlling resource utilization. Initially, at step 510, a first channel within a network that is associated with existing traffic under a predetermined threshold is identified. New traffic is eliminated from accessing the channel at step 520 and, at step 530, activity of the existing traffic is monitored. At step 540, is it identified when activity of the existing traffic has ceased. At step 550, the existing traffic is transferred from the first channel to one or more other channels once the activity of the existing traffic has ceased.

Figure 6:
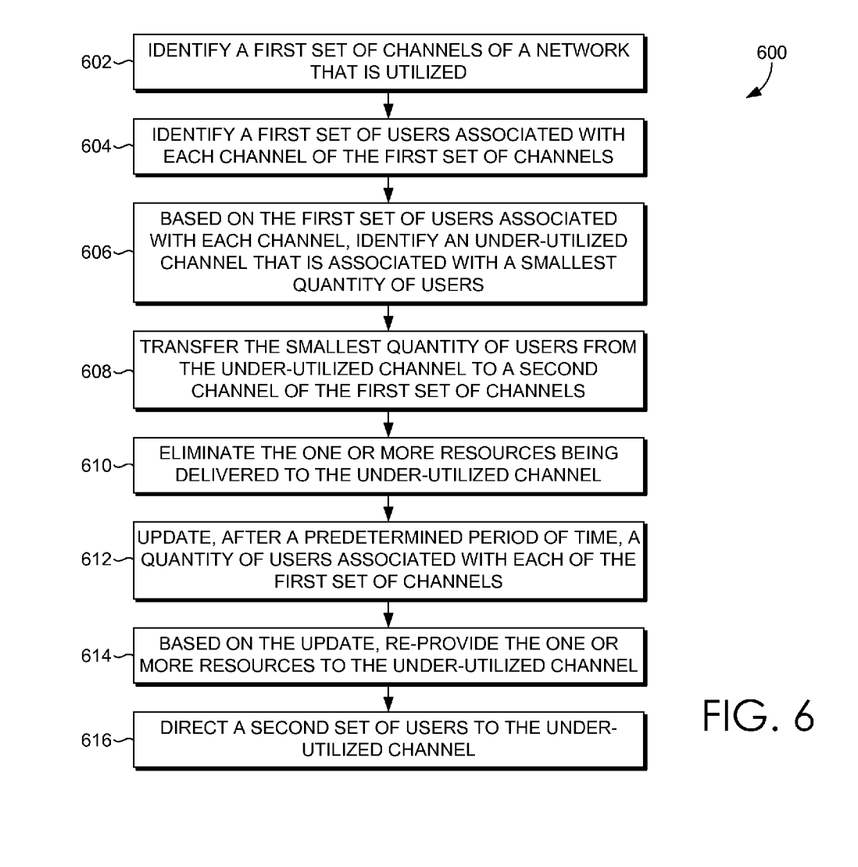
FIG. 6 depicts an illustrative flow diagram that depicts a method for controlling resource utilization, in accordance with an embodiment of the present invention.

Turning now to FIG. 6, referenced generally by the numeral 600, a flow diagram is depicted showing a method of controlling resource utilization. Initially, at step 602, a first set of channels that is utilized is identified. At step 604, a first set of users associated with each channel of the first set of channels is identified. At step 606, an under-utilized channel that is associated with a smallest quantity of users is identified based on the first set of users associated with each channel of the first set of channels. At step 608, the smallest quantity of users is transferred from the under-utilized channel to a second channel of the first set of channels. At step 610, the one or more resources being delivered to the under-utilized channel are eliminated. At step 612, a quantity of users associated with each channel of the first set of channels is updated after a predetermined period of time. At step 614, based on the update, the one or more resources are re-provided to the under-utilized channel. At step 616, a second set of users is directed to the under-utilized channel.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable media having computer-executable instructions embodied thereon that, when executed, enable a computing device to perform a method of controlling resource utilization, the method comprising:
   identifying a quantity of channels utilized, wherein a channel is a frequency within a network, and wherein a channel is utilized when it is receiving one or more resources to facilitate one or more telecommunications actions;
   identifying a quantity of users associated with each channel of the quantity of channels;
   based on the quantity of users associated with each channel of the quantity of channels, identifying an under-utilized channel that is associated with a smallest quantity of users;
   transferring all users from the under-utilized channel to at least one other channel of the quantity of channels; and
   eliminating the one or more resources being delivered to the under-utilized channel, wherein the one or more resources comprise at lest power to the under-utilized channel.

2. The media of claim 1, wherein the one or more wireless telecommunications actions is a wireless telecommunications call by a mobile phone.

3. The media of claim 1, wherein the smallest quantity of users are transferred from the under-utilized channel while active on the under-utilized channel.

4. The media of claim 1, further comprising identifying a peak time of each of the quantity of channels.

5. The media of claim 1, further comprising identifying a non-peak time of each of the quantity of channels.

6. The media of claim 5, further comprising eliminating the one or more resources to one or more non-peak channels that are identified to be in non-peak time.

7. The media of claim 6, further comprising transferring one or more users from the one or more non-peak channels to at least one other channel of the quantity of channels.

8. The media of claim 1, further comprising identifying a low-loading condition for a second channel, wherein a low-loading condition indicates a low quantity of attempts to access the network from a second channel.

9. The media of claim 8, wherein the one or more resources being delivered to the second channel is eliminated.

10. The media of claim 9, further comprising transferring a second set of users from the second channel to at least one other channel of the quantity of channels.

\* \* \* \* \*